United States Patent [19]

Lindqvist et al.

[11] Patent Number: 5,271,703
[45] Date of Patent: Dec. 21, 1993

[54] AUTOMATIC ORDER SELECTION SYSTEM CAPABLE OF RESPONDING TO SIMULTANEOUS ORDER REQUESTS

[75] Inventors: Per-Erik Lindqvist, Easton; Jeffry H. Wetherell, Nazareth, both of Pa.

[73] Assignee: SI Handling System, Inc., Easton, Pa.

[21] Appl. No.: 880,618

[22] Filed: May 8, 1992

[51] Int. Cl.$^5$ ............................................. B65G 1/04
[52] U.S. Cl. ..................... 414/268; 186/55; 364/478; 414/797.9; 414/273; 414/786
[58] Field of Search ............ 414/273, 268, 285, 797.9, 414/786; 186/55; 364/478

[56] References Cited

U.S. PATENT DOCUMENTS

| | | | |
|---|---|---|---|
| 2,715,950 | 8/1955 | Law | 186/55 |
| 3,153,487 | 10/1964 | Hoeller | 186/55 X |
| 3,379,321 | 4/1968 | Weir | 414/285 X |
| 3,741,345 | 6/1973 | Saridis | 186/55 |
| 4,501,528 | 2/1985 | Knapp | 414/273 |
| 4,542,808 | 9/1985 | Lloyd, Jr. et al. | 364/478 X |
| 4,867,628 | 9/1989 | Ammon et al. | 414/273 |
| 5,106,259 | 4/1992 | Anderson et al. | 414/273 X |

OTHER PUBLICATIONS

SI Dispen-SI-matic advertisement, Wholesale Drugs Magazine, Oct./Nov. 1991.

Primary Examiner—David A. Bucci
Attorney, Agent, or Firm—Seidel, Gonda, Lavorgna & Monaco

[57] ABSTRACT

An order selection system is disclosed having a downwardly sloped plate, and stationary and movable dispensing means both of which are responsive to a system controller of the system. The system controller has an electronic device such as a microprocessor preprogrammed with operating routines, which are responsive to a selected order request issued by an external device. The system controller correlates the control of both type dispensers so that each of the products in the selected order request is retrieved from its storage location and placed on the moving gathering belt within a dynamically assigned order space. The operation of both type dispensers is controlled by the system controller so that the controller dynamically assigns space on the moving gathering belt, allowing the controller to service simultaneous order selection requests that may occur from one or more external devices.

22 Claims, 8 Drawing Sheets

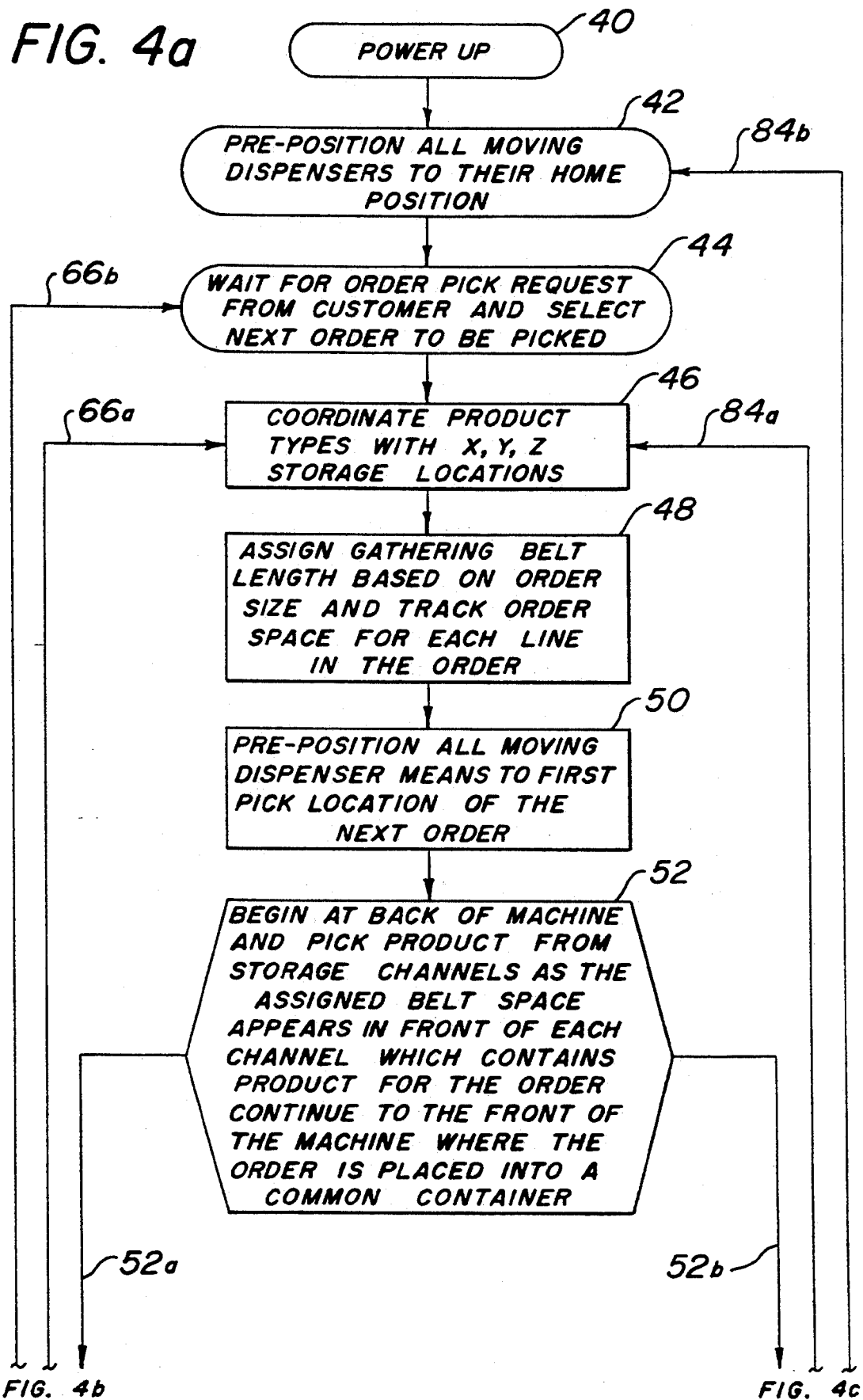

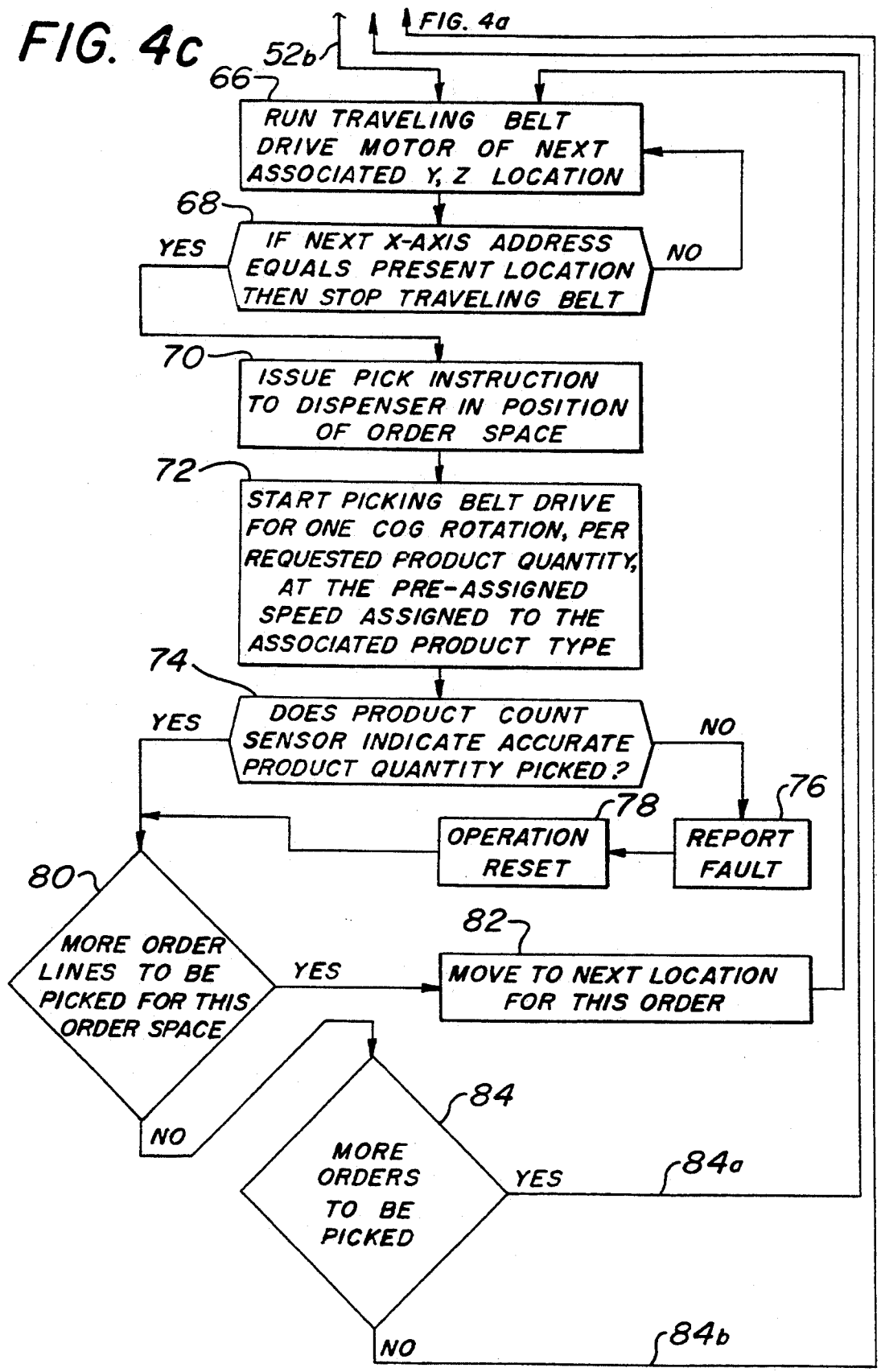

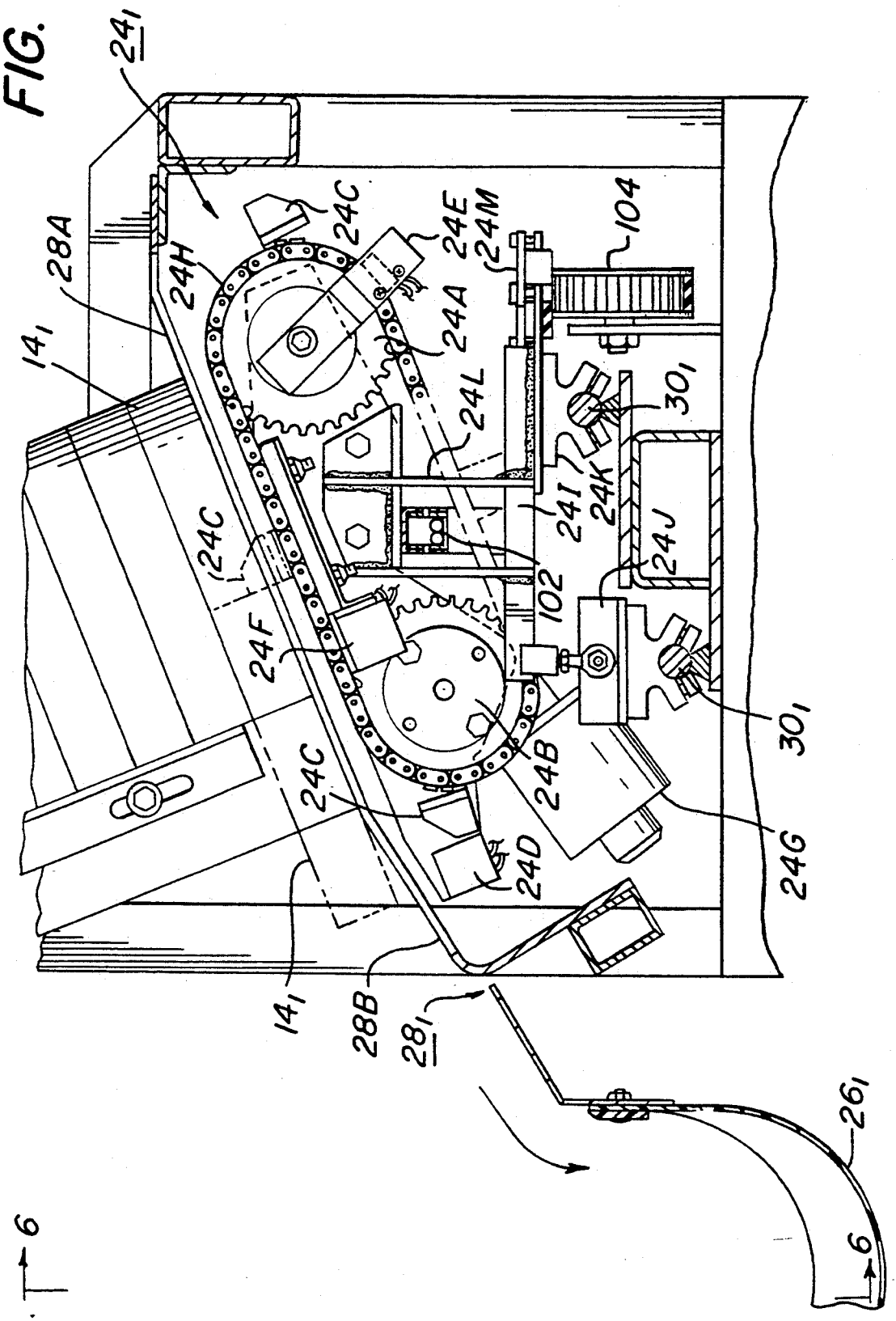

AUTOMATIC ORDER SELECTION SYSTEM CAPABLE OF RESPONDING TO SIMULTANEOUS ORDER REQUESTS

FIELD OF THE INVENTION

The present invention relates to an order selection system having at least one stationary dispensing means and at least one movable dispensing means with each such dispensing means including at least one movable and vertically extending cog. Each of the dispensing means is responsive to a system controller for retrieving products, such as packaged items, from storage locations in storage magazines that have a modular arrangement and which are located in a warehouse. The retrieved products, under control of the system controller, are placed onto a gathering belt which conveys the products to a central gathering station. The system controller immediately responds to an external device that issues a selected order request specifying products to be retrieved and dynamically assigns space on the moving gathering belt in such a manner that a plurality of selected order requests may be serviced simultaneously.

BACKGROUND OF THE INVENTION

The storage and retrieval capabilities of warehouse systems are ever increasing so as to keep up to the demand of the ever increasing variety of products being made available to the general public. This increasing demand is being encountered in many fields such as pharmaceutical products; distribution of cosmetics; health and beauty aids; contact lenses; photographic films; automotive equipment; audio and video cassettes; books; and many more fields associated with consumer products. This ever increasing demand correspondingly creates a need to increase the storage and retrieval capabilities of the warehouse stocking these commodities.

To meet these ever-increasing demands, warehouse systems have been automated and, more particularly, are controlled by various computerized systems, one of which is disclosed in U.S. Pat. No. 4,501,528 (Knapp). The system of Knapp has shelves serving as storage locations within storage magazines to which the shelves are attached and in which are stored packaged items or products in a stacked arrangement. Each of the storage locations has an assigned ejector, responsive to commands initiated by computer, for retrieving the stacked products. The retrieved products are directed onto a conveyer, sometimes called a gathering belt, which transports the ejected items to a central station for collection. The prior art arrangement of Knapp is somewhat expensive because it requires an individual ejector for each individual storage locations. It is desired that a computerized system, generally referred to as an order selection system, be provided which eliminates the need for individual ejectors so as to reduce the attendant cost of the computerized order selection system.

Accordingly, it is an object of the present invention to provide a computerized order selection system wherein the number of ejectors needed to retrieve the products stacked in storage locations is reduced relative to prior art systems, while at the same time the capabilities of the system are increased so as to serve a larger number of storage locations and, thus, retrieve a larger number of products stacked in those storage locations.

It is a further object of the present invention to provide a ejector or dispenser means that is responsive to a computer and reliably directs the dispensed or retrieved items from the storage locations onto a gathering belt so as to move the items to a central gathering station.

Still further, it is an object of the present invention to provide a system having dispensing means which are of both the stationary and movable types, and which may total in number from one to several hundred, with each of the dispensing means being independently responsive to a system controller.

Moreover, it is an object of the present invention to provide a system controller which immediately responds to an external device, such as a computer, that issues a selected order request specifying one or more products to be retrieved. The system controller of the present invention dynamically assigns space on the gathering movable belt in such a manner so that a plurality of selected order requests may be serviced simultaneously.

Further still, it is an object of the present invention to provide both stationary and movable dispensing means each having at least one vertically extending cog that cooperates with a slotted plate, upon which products rest, for accurately and reliably retrieving stored products that may be stocked in storage locations of the storage magazines of a warehouse.

SUMMARY OF THE INVENTION

The present invention is directed to a computerized order selection system which responds to an order selection request from an external device that specifies the products to be retrieved from storage locations. The order selection system responds by dynamically assigning space on a moving gathering belt, in such a manner so that a plurality of order selection requests from one or more external devices can be simultaneously serviced by the single order selection system. The specified products are retrieved by a combination of stationary and movable dispensers both of which are under control of the system controller. This combination may comprise one or more stationary dispensers cooperating with one or more movable dispensers. Further, this combination may be composed of stationary and movable dispensers located at the same or separate tiers where the retrievable products are stored.

The order selection system retrieves products stored in predetermined storage locations of storage modules placed in a warehouse, and delivers such retrieved items to a central gathering station by means of one or more conveyors comprising a dynamically moving gathering belt. The stored products are classified in accordance with their public demand as slow, medium and fast moving. The storage modules of the warehouse comprise one or more tiers arranged on vertically oriented frame members and the tiers have X, Y and Z axes. Some of the tiers have drive means for moving a mechanism on rails longitudinally along the X-axis of the tier. The predetermined storage locations each has predetermined coordinates of the X, Y and Z axes.

The system comprises, a plurality of plates, at least one stationary dispenser and at least one movable dispenser, and a system controller. The plates have a first and a second portion as well as a plurality of slots each extending through into at least a part of a downwardly contoured portion of the plate which is located above the gathering belt. The products are located over and arranged to be in communication with the slots. The plates respectively extend longitudinally along each of the X axis of the storage modules. The at least one stationary dispensing means has at least one vertically extending cog and is position along a first portion of the plates at a predetermined slot thereof, and the cog is responsive to the system controller. The at least one movable dispensing means also has at least one vertically extending cog that is responsive to the system controller. The at least one movable dispensing means has means responsive to the drive means and means responsive to the system controller. The movable dispensing means is longitudinally moved along the second portion of the plates to one or more preselected slots thereof.

The system controller has electronic means, such as microprocessor means preprogrammed with operating routines which are immediately responsive to a selected order request, issued by an external device such as a computer, that includes a specified quantity of each product making up the order. The system controller dynamically assigns a space on the moving gathering belt to each product included within the selected order request. The system controller comprises means, in the form of the microprocessor responsive to the operating routines, that control the stationary and movable dispenser. The means of the controller for controlling the stationary dispensing means, causes the cog of the stationary dispenser to be moved at a preselected time and for a predetermined distance. The means for controlling the at least one movable dispensing means, causes movement of the movable dispensing means at a preselected time and to a predetermined slot of the second portion of the plates. After being moved to its preselected slot, the cog of the movable dispenser is moved at a preselected time and for a predetermined distance. Further, the means for controlling the system controller comprises means for identifying the storage location corresponding to each product included within the selected order request. Still further, the means for controlling the system controller comprises means for determining the total space on the moving gathering belt, needed to accommodate all of the products included within the selected order request. The total space comprises an assigned order space on the gathering belt for the selected order request. Further still, these means of the controller comprises means for correlating the means for controlling said stationary dispensers with the means for controlling said movable dispenser, so that each of the products is retrieved from its storage location and placed on the moving gathering belt within the assigned order space. This correlation ensures the cooperative interaction between one or more stationary dispensers and one or more movable dispensers located at the same or different tiers where the retrievable products are stored. An important aspect of the present invention is that the assigned order space is accomplished in a dynamic manner; i.e., the assigned order space is not pre-assigned, but rather is changed and further alterable while both the gathering belt and movable dispensing means are traveling so that the system controller can service, if necessary, simultaneous selected order requests occurring from one or more external devices.

In a preferred method of operating the system, the system controller has a microprocessor that responds to routines that operate on a "real time" basis, i.e., the routines immediately respond to a selected order request issued by an external device such as a computer. This method then identifies the storage locations corresponding to each product included within the selected order request. The system controller preferably has operating routines that track or determine the proper operation of each dispensing means as it is retrieving products by monitoring external sensors which detect if a selected product is available to be retrieved, if the product has been retrieved, and if the extended cog that is retrieving the product returns to its home position on the dispensing means.

The preferred method controls the at least one stationary dispensing means located at the predetermined slot so that its cog is moved at a preselected time and for a preselected distance. This method also controls the at least one movable dispensing means so that the dispensing means is moved at a preselected time to a preselected slot of the second portion of the plate, after which, the cog of the movable dispensing means is moved at a preselected time and for a predetermined distance. This method determines the total space on the moving gathering belt needed to accommodate all of the products included within the selected order request, and correspondingly and dynamically determines an assigned order space on the moving gathering belt for the selected order request. The method correlates the cooperative interaction of the means for controlling stationary dispenser with the means for controlling the movable dispenser, so that each of the products being retrieved from its storage location, is placed on the gathering belt within the assigned order space. The tasks included in the operating routines have dynamic assignment features, so that the system controller provides control over one or more of each type of dispensing means as well as dynamically providing assigned order space on the moving gathering belt, while at the same time the controller is able to respond to and service simultaneously occurring selected order requests from one or more external devices.

Other objects, advantageous and novel features of the present invention will become apparent from the following detailed description of the invention when considered in conjunction with the accompanying drawings.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 5 is a view, taken along line 5—5 of FIG. 1, illustrating further details of the movable dispensing means.

DETAILED DESCRIPTION OF THE INVENTION

Figure 1:
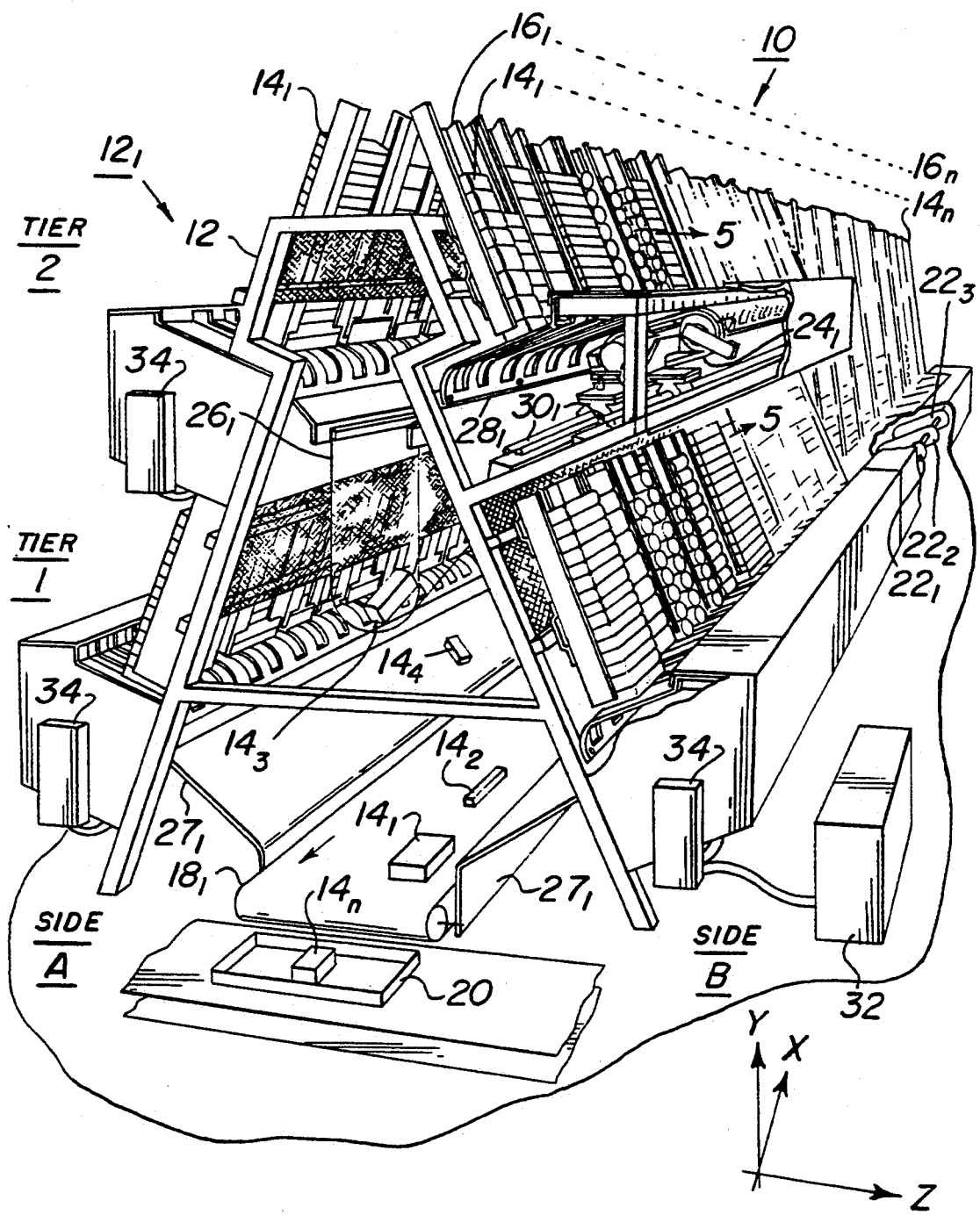
FIG. 1 is a functional illustration of one of the storage modules and is shown, in two locations thereof, as being partially broken away so as to generally illustrate the stationary and movable dispensing means, as well as other elements related to the present invention.

The present invention relates to a computerized order selection system 10 illustrated in FIG. 1 as comprising a storage module $12_1$ used for storing or stocking packaged items or products within a warehouse. In actuality, the system 10 may comprise a plurality of storage modules $12_1$, but such additional modules are not shown in FIG. 1 for the sake of clarity. The system 10 of FIG. 1, as well as FIGS. 2-7, being of a modular-type arrangement, uses a numbered subscript, such as 1, to show elements of the same type or of the same family, and uses a letter symbol, such as A, to show the components associated with an assembly or subsystem having a common reference number. The numbered subscript is used herein to represent that the illustrated or described element, may be comprised of the indefinite number "n" that varies in accordance with the number needed for any particular application or arrangement. For the sake of brevity, all the numbered elements are not fully illustrated or described herein, but rather are generally referred to being included in series; i.e., 1, 2 . . . n. Accordingly, the description of system 10 related to one of the shown elements of a family; e.g., storage module $12_1$, is equally applicable to the remaining elements; e.g., storage modules $12_2, 12_3 \ldots 12_n$. This commonality of description is applicable to all elements of the present invention having the same reference number and using the numbered subscript nomenclature.

The system 10 operates to retrieve the packaged items or products $14_1 \ldots 14_n$ stocked in storage locations $16_1 \ldots 16_n$ of storage modules $12_1 \ldots 12_n$ located in a warehouse, and delivers such retrieved items, by means of conveyors such as $18_1$ serving as a moving gathering belt and moving in a direction indicated by the shown arrows, to a common conveyor 20 comprising a central gathering station. It should be noted that the subscript nomenclature of the products $14_1 \ldots 14_n$ does not correspond to the subscript nomenclature of the storage locations; i.e., $16_1 \ldots 16_n$. For example, the products $14_1, 14_2, 14_3, 14_4$ and $14_n$, shown as being moved by gathering belt $18_1$, may have been retrieved from any of the storage locations $16_1 \ldots 16_n$ of the storage module $12_1$ of FIG. 1.

Storage module $12_1$ is partially arranged on vertically oriented frame members 12 (shown in FIG. 1) that preferably have an "A" shape. For the embodiment shown in FIG. 1, the front portion of storage module $12_1$ comprises "A" shaped frame members, whereas the rearward portion of module $12_1$ comprises vertical frame members not having a "A" shape. If desired, the shape of the frame members of the front and rearward portion may be reversed. All portions of the storage module $12_1$ have predetermined X, Y and Z axes oriented as illustrated in the lower portion of FIG. 1.

FIG. 1 illustrates the storage module $12_1$ as having a Y axis, better defined as tiers 1 and 2; with tier 1 serving as the lower most quantity of the Y axis and tier 2 serving as the upper most quantity of the Y axis. Further, FIG. 1 illustrates that the storage module $12_1$ has a Z axis, along which are two sides designated as Side A and Side B. Further, FIG. 1 illustrates that each of these Y/Z axes has an X axis, in which the related storage locations $16_1$ and $16_n$ respectively form the minimum and maximum quantities of the X axis. FIG. 1 further illustrates that the products $14_1 \ldots 14_n$ are located in the storage locations of both tiers 1 and 2, and on both sides A and B. Further still, as will be further described, each of the products $14_1 \ldots 14_n$ is located in storage locations $16_1 \ldots 16_n$ each having predetermined coordinates of the X, Y and Z axes of the storage module $12_1$.

Figure 7:
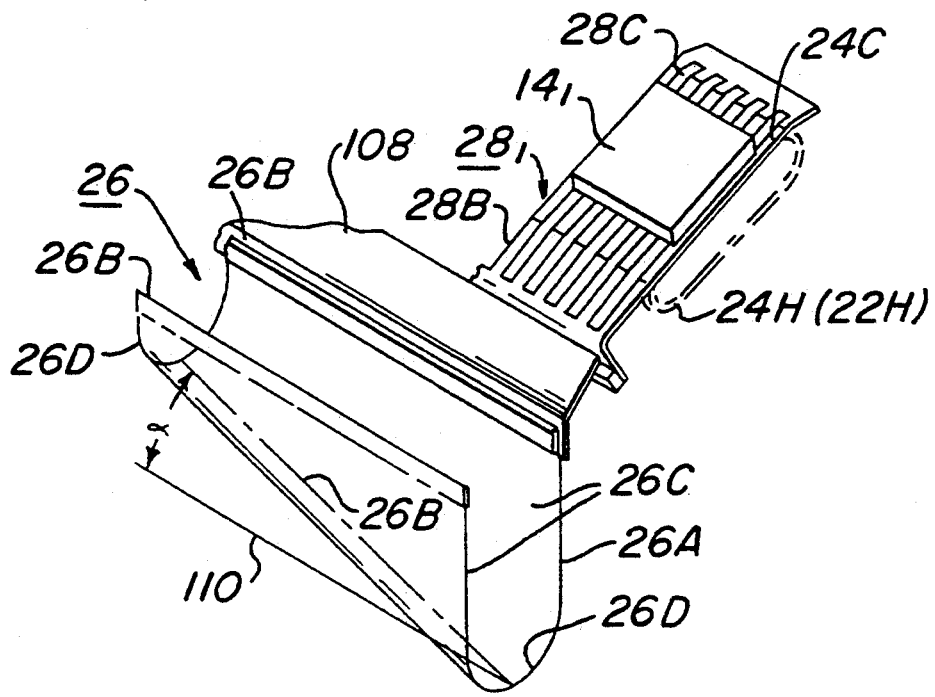
FIG. 7 illustrates the details of a chute arranged to direct a product retrieved from a storage location onto the gathering belt.

An important feature illustrated in FIG. 1 is that the storage module $12_1$ comprises both at least one stationary dispensing means 22 (shown; e.g., in tier 1, side B as $22_1, 22_2$ and $22_3$) and at least one movable dispensing means 24 (shown; e.g., in tier 2, side B as $24_1$). Each of the dispensing means $22_1 \ldots 24_n$ has at least one vertically extending and movable cog to be further described with reference to FIG. 5. A preferred feature is that the storage module $12_1$ of FIG. 1 has one or more chutes $26_1$ which are positioned to service both sides A and B of tier 2. If desired, a chute $26_1$ may also be arranged to service both sides A and B of tier 1, or a separate chute $26_1$ may be arranged to service each of the sides A and B of each of the tiers 1 and 2. For such arrangements, all that is necessary, as to be further described with reference to FIG. 7, is that the chute $26_1$ be arranged to intercept the product $14_1 \ldots 14_n$ after it has slid down the product support plate $28_1$. As seen in FIG. 1, the products $14_1 \ldots 14_n$, such as $14_4$, stored on both sides of tier 1 slide down sloped members $27_1$, positioned under plates $28_1$, and are directed onto the moving gathering belt $18_1$.

The product support plate $28_1$ is also an important feature of the present invention and is arranged on each tier and on each side of module $12_1$. The plate $28_1$, having slots therein and downwardly sloped portions, extends longitudinal along the X axis of each of the tiers 1 and 2 and on each side A and B. The plate $28_1$ has a first and second portion respectively serviced by dispensing means $22_1 \ldots 22_n$ and $24_1 \ldots 24_n$. The first and second portions may be of any desired length and, if desired, any of the dispensing means $22_1 \ldots 24_n$ may be arranged to service either or both of these portions in any of the tiers.

Some of the tiers, such as tier 2 side B, have a X-axis rail $30_1$ of two longitudinally extending members upon which a moving mechanism, such as dispensing means $24_1$, is guided and positioned. The dispensing means $24_1$ is moved in response to drive means which, in turn, is responsive to a system controller 32. The movable dispensing means $24_1$, as well as the stationary dispensers $22_1 \ldots 22_n$ and other essential elements of the present invention are more clearly shown in FIGS. 5, 6 and 7 to be described hereinafter. The one or more stationary dispensing means $22_1 \ldots 22_n$ and the one or more moving dispensing means $24_1 \ldots 24_n$, are each independently responsive to electrical signals generated by the system controller 32 and routed to the dispensers $22_1 \ldots 24_n$, in part, by means of power and distribution panels 34 having appropriate cabling and interconnections within each tier (i and 2) of each side (A and B) of the storage module $12_1$.

A primary feature of the present invention is its method of operation of the system controller 32. In general, the operation of controller 32 provides a system 10 that serves as a "order selection machine" employing both the movable type dispensing means $24_1 \ldots 24_n$ and stationary type $22_1 \ldots 22_n$. The number of dispensing means $22_1 \ldots 24_n$ may be from one to several hundred, dependent upon the number of products to be retrieved from their storage locations, and the speed at which these products are desired to be retrieved by the order selection system 10. The order selection system 10 retrieves packaged items or products $14_1 \ldots 14_n$ from storage locations $16_1 \ldots 16_n$, and directs such retrieved products onto the moving gathering belt $18_1$, that transports the packages to the central collecting station 20. As will be more fully described, the system controller has electronic means, such as microprocessor means, preprogrammed with operating routines that allow for the simultaneous retrieval of products included in different order selection requests from an external source, such as computer situated at an order/shipment distribution center. The products stocked in the storage locations are classified as being fast, medium or slow moving, wherein such classifications are meant to represent the public's demand for the product, not the speed in which these products are moved within the system of the present invention.

The public demand classification of the product is taken into account in the arrangement of system 10. For example, a stationary or fixed dispensing means $22_1$ may be dedicated to retrieve, on a frequent basis, a fast moving product, whereas a slow moving product that is retrieved on an infrequent basis may be one of the many products retrieved by a moving dispensing means $24_1$. Different combinations of the stationary dispensers $22_1 \ldots 22_n$ and movable dispensers $24_1 \ldots 24_n$, located at the same or different tiers, may be commonly used to retrieve a wide variety of products. Such arrangements enhance the speed of response of the order selection system 10 to an external computerized ordering system. The dispenser means $22_1 \ldots 24_n$ can be arranged in virtually any configuration desired so as to serve the needs of any external ordering device. Further, the dispensing means $22_1 \ldots 24_n$ can be configured to cooperate with a single or multiple moving gathering belts $18_1$. An illustrative configuration of the dispensing means $22_1 \ldots 24_n$, within the storage module $12_1$, may be discussed with reference to FIG. 2.

Figure 2:
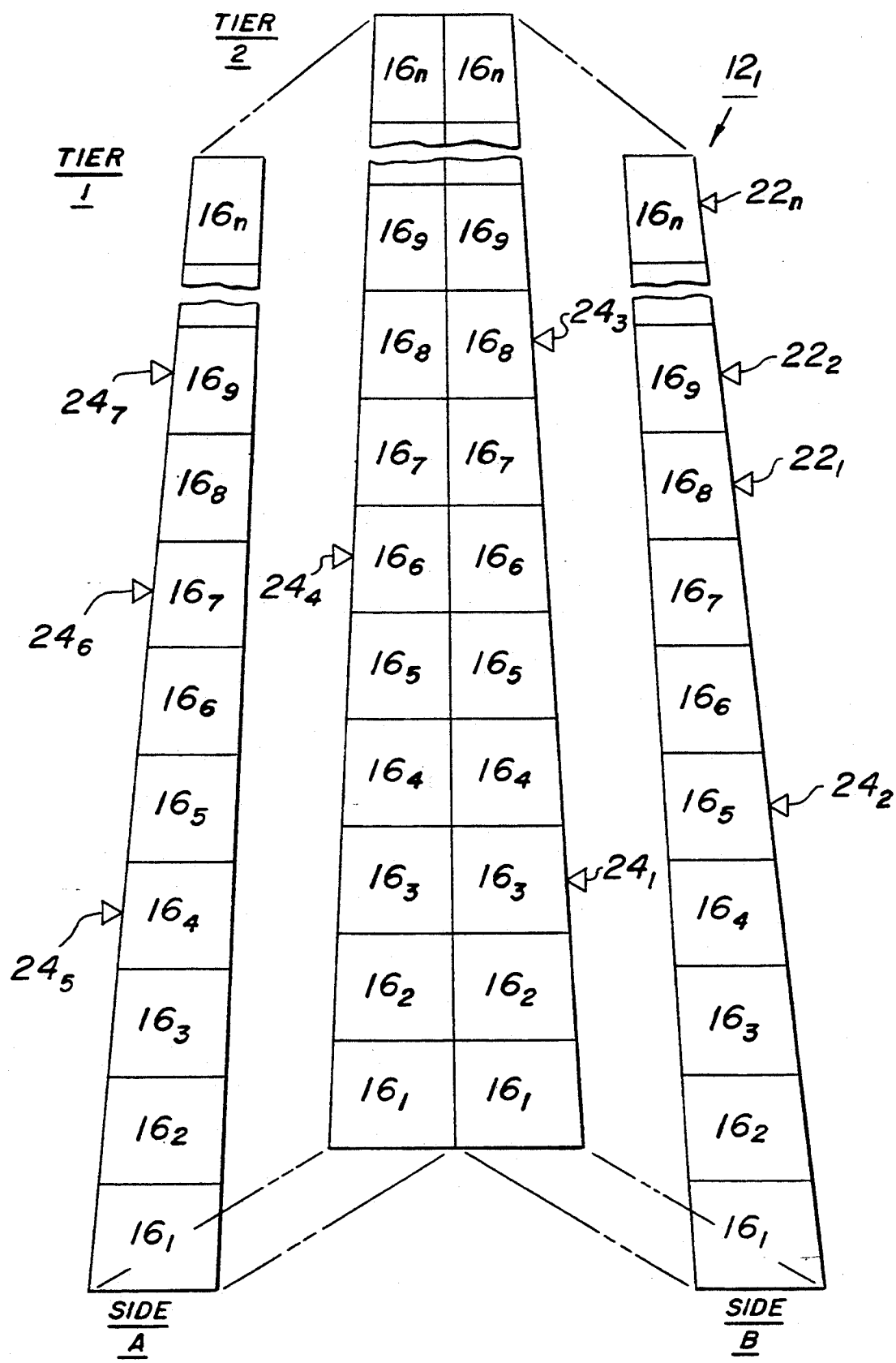
FIG. 2 is a schematic further illustrating the arrangement of a plurality of stationary and movable dispensing means within the storage modules of the present invention.

FIG. 2 functionally illustrates an arrangement of dispensing means $22_1 \ldots 24_n$ assigned to service and retrieve products stacked in storage locations in both tiers (1 and 2) and in both sides (A and B) of the storage module $12_1$. The storage module 12 is shown in FIG. 2 as having a "A" shape although, as previously discussed with reference to FIG. 1, the rearward portion serviced by dispensing means $22_1 \ldots 22_n$ is only vertically shaped. The dispensing means $22_1 \ldots 24_n$ are functionally (pick-head) illustrated in FIG. 2 by the use of an arrowhead, having a line leading to the reference number with its subscript indicated therewith. The storage locations $16_1 \ldots 16_n$ are representatively illustrated for each tier (1 and 2) of each side (A and B) of the storage module $12_1$ shown in FIG. 1. It should be noted that three separate stationary dispensing means $22_1$, $22_2$ and $22_n$ are dedicated to respectively retrieve products from the storage locations of the rearward portion of tier 2, side B so as to substantially conform to that illustrated in FIG. 1. Similarly, the movable dispensing means $24_1$ of FIG. 1 is shown in FIG. 2 as positioned at tier 2, side B. The arrangement of FIG. 2 is primarily for illustrative purposes and may be of any other arrangement so as to fit the system requirements for the retrieval of products being ordered from any external source. The correlation of the dispensing means $22_1 \ldots 24_n$ to the storage location $16_1 \ldots 16_n$, all shown in FIG. 2, is given in Table 1, wherein the dispensing means are abbreviated as Disp. Means.

TABLE 1

| Disp. Means | Storage Locations | Side | Tier |
|---|---|---|---|
| $24_5$ | $16_1$–$16_4$ | A | 1 |
| $24_6$ | $16_5$–$16_7$ | A | 1 |
| $24_7$ | $16_9$–$16_n$ | A | 1 |
| $24_4$ | $16_1$–$16_n$ | A | 1 |
| $24_1$ | $16_1$–$16_3$ | B | 2 |
| $24_3$ | $16_4$–$16_n$ | B | 2 |
| $24_2$ | $16_1$–$16_7$ | B | 1 |
| $22_1$ | $16_8$ | B | 1 |
| $22_2$ | $16_9$ | B | 1 |
| $22_n$ | $16_n$ | B | 1 |

The X axis, shown in FIG. 1, of the system 10 takes into account all of the X-axis rails $30_1 \ldots 30_n$ that run within some, but not all, of the tiers of system 10. The X axis also takes into account the X axis portion of the tiers serviced by the stationary dispensing means $22_1 \ldots 22_n$ that are devoid of X axis rails $30_1 \ldots 30_n$. Similarly, the Y axis of system 10 includes all of the vertically arranged tiers of each of the storage modules $12_1 \ldots 12_n$. Each of storage locations $16_1 \ldots 16_n$ is assigned X-Y coordinates that define a particular location within X and Y axes of system 10. Further, each product $14_1 \ldots 14_n$ is assigned to be stored in one or more storage locations $16_1 \ldots 16_n$. Further still, each of the moving dispensing means $24_1 \ldots 24_n$ is correlated to a plurality of storage locations $16_1 \ldots 16_n$ which, in turn, is assigned a band of X-Y coordinates, so that each moving dispensing means $24_1 \ldots 24_n$ services a particular band of storage locations $16_1 \ldots 16_n$. Moreover, each of the dispensing means $24_1 \ldots 24_n$ of system 10 may be assigned a variable home or at-reset position. Unlike the movable dispensing means $24_1 \ldots 24_n$, the stationary dispensing means $22_1 \ldots 22_n$ are dedicated to a particular storage location $16_1 \ldots$ or $16_n$. All of the X, Y and Z coordinates of all of the storage locations and all of fixed coordinates of the stationary dispensing means $22_1 \ldots 22_n$, as well as the band of coordinates of the movable dispensing means $24_1 \ldots 24_n$, are used as parameters by system controller 32 to control the operation of the order selection system 10.

In general, the system controller 32 of system 10 independently controls the movement of each movable dispensing means $24_1 \ldots 24_n$, along the X axis rails, and coordinates such movement with any of the dispenser means $24_1 \ldots 24_n$ that may be sharing that same X axis rail. The system controller 32 also controls the operation of the stationary dispensing means $22_1 \ldots 22_n$. The system controller 32 comprises electronic means, such as microprocessor means, preprogrammed with operating routines. The microprocessor within the controller 32 operates in response to the preprogrammed routines to coordinate and integrate the overall operation of the system 10. The routines may be altered so as to accommodate for increases or decreases in any warehouse configuration. The system controller 32 operates on a "real time" basis (immediate response) to service an external device making a request to retrieve particular products of a specified amount from the storage module $12_1$. The operating routines (controlling means) of the system controller 32 allow the controller 32 to respond to an service a plurality of simultaneously selected order requests from one or more external devices. The operation of the system controller may be described, in part, using terms and phrases each having a general definition as given in Table 2.

TABLE 2

| TERMS AND PHRASES | GENERAL DEFINITION |
|---|---|
| line to be picked | refers to the storage location where the product to be retrieved is presently stored |
| selected order | an order requested by a customer and which included a specified quantity of each product making up that order |
| assigned order space | space on the gathering belt assigned by the system controller to a selected order |
| sizing table | specifies the minimum amount of space to be allocated on the gathering belt for the total number of products included in a selected order |
| size requirement for a line to be picked | calculations that determine the time it would take to retrieve all the pieces in a line being picked and translating that time into the necessary space required to place all of these retrieved products onto the gathering belt. The calculations include the time required to position the dispenser under the product, plus the pick speed assigned to each particular product in the selected order. However, the time to position the dispenser is excluded, if the dispenser can be pre-positioned ahead of the assigned order space or if the dispenser is the stationary type |
| space requirement | refers to the space required on the gathering belt |
| space requirement of selected order | refers to the total space needed to be allocated by the system controller on the gathering belt so that all the products within a selected order may be retrieved, placed on, and carried away by the gathering belt |
| assigned position within space requirement of selected order | refers to the proper position within space of the selected order that is occupied by a retrieved product so that an even distribution of all of the products within the selected order on the gathering belt is achieved |
| before order safety gap | a specified amount of space that comes before the total space on the gathering belt that carries all of the products included within a selected order. This safety space is assigned to prevent any intermingling of products from different selected orders that might otherwise occur because of unwanted sudden start or stop conditions of the gathering belt |
| after order safety gap | a specifed amount of space that comes after the total space on the gather belt that carries all of the products included within a selected order. This safety space is assigned to prevent any intermingling of products from different selected orders that might otherwise occur because of unwanted, sudden start or stop conditions of the gathering belt |
| track order space | refers to the monitoring, preferably of optical sensors, of the operation one or more stationary or movable dispensers involved during the retrieval of the products of the selected order |
| next order to be picked | refers to the selected order request that is already being processed or the next selected order request to be processed |
| front of machine | refers to the regions of the storage magazines closest to the collection station |
| back of machine | refers to the regions of the storage magazine which are the furtherest away from collection station |
| common carrier | device which carries all of the products of a selected order that have been retrieved from their storage locations and directed into the common carrier by the gathering belt |
| pick instructions | refers to instructions issues by the system controller 32 and transmitted to the dispensing means $22_1 \ldots 24_n$. These instructions are responded to by the dispensing means $22_1 \ldots 24_n$ moving the respective extended cog for a prescribed distance and a proscribed speed so as to control and engage the related product so that the product is retrieved from its assigned storage location and placed onto its related |

TABLE 2-continued

| TERMS AND PHRASES | GENERAL DEFINITION |
|---|---|
| | chute; whereby it is directed onto the gathering belt |
| start cogged belt for one rotation | refers to the instruction issued by the system controller 21 to the stationary dispensing means $22_1 \ldots 22_n$ that is responded to by the dispensing means $22_1 \ldots 22_n$ moving its extended cog a prescribed amount; i.e., if one cog is used this amount is 360° of belt rotation; whereas if two cogs are present this amount is 180° of belt rotation |
| start picking belt drive for one cog rotation | refers to the instruction issued by the system controller 32 to the movable dispensing means $24_1 \ldots 24_n$, that is responded to by the dispensing means $24_1 \ldots 24_n$ moving its extended cog one (one cog) or one-half (two cogs) rotation of its belt |

Figure 3:
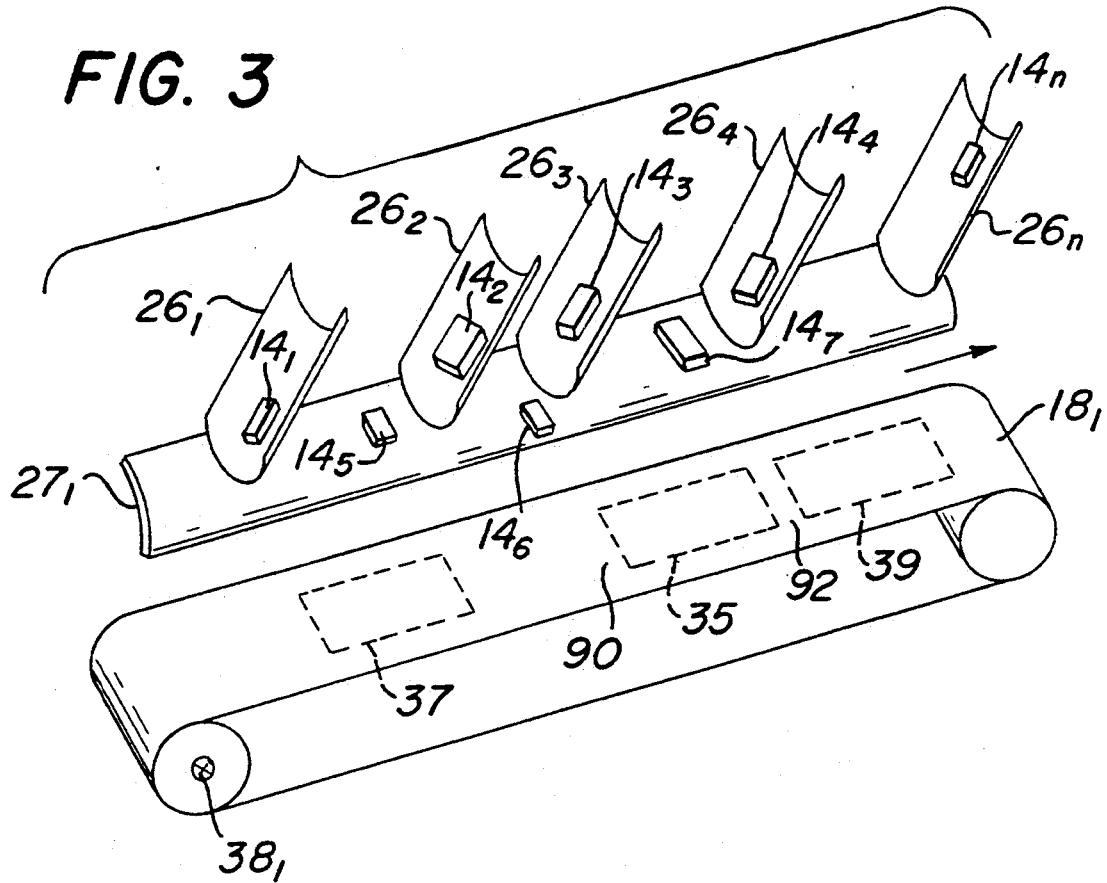
FIG. 3 is a schematic illustration of one or more dynamically assigned order spaces on the moving gathering belt for carrying the products of respective selected order requests. The products may be retrievable by one or more stationary or movable dispensers located at separate or different tiers where the products are stored.

The operation of the system controller 32 in its control of the order selection system 10, may be described by first referring to FIG. 3, which functionally illustrates the placement of product $14_1 \ldots 14_n$, guided by chutes $26_1 \ldots 26_n$ and sloped member $27_1$, onto one or more assigned order spaces, such as 35, 37 or 39 of the gathering belt $18_1$. FIG. 3 illustrates products $14_1, 14_2, 14_3, 14_4$ and $14_n$ as being respectively directed by chute $26_1, 26_2, 26_3, 26_4$ and $26_n$, and products $14_5, 14_6$ and $14_7$ as being directed by sloped member $27_1$. The products directed by the chutes and the sloped members may be retrieved by any stationary or movable dispenser from any storage location located at any tier and from either side of any tier. FIG. 3, for the sake of clarity, illustrates the products as being directed by chutes $26_1 \ldots 26_n$ located on tier 2 and by sloped member $27_1$ located on side B of tier 1. The gathering belt $18_1$ may be moved in either direction, but is illustrated in FIG. 3 as being moved in the direction indicated by the arrow. Similarly, the length and space between the assigned order spaces 35, 37 and 39 are variable quantities depending upon the space on the moving belt $18_1$ assigned by the system controller 32 for carrying these products, but are shown in FIG. 3 for illustrative purposes as being fixed values. The area on the belt occupied by any one order space should not be interrupted or occupied by any other order space.

As to be described, assigned order space 39 is shown for illustrative purposes as being located near chute $26_n$ which is associated with the operation of a stationary dispenser $22_n$. In actuality, stationary and movable dispensers, located at the same or different tiers, cooperate with each other to retrieve products for an order space such as order space 39. The assigned order spaces 35 and 37 are to be further described with reference to the operation of movable dispensing means $24_1 \ldots 24_n$.

The position and movement of the gathering belt $18_1$, is detected by one or more sensors $38_1$, each having means for transferring its sensed information to the system controller. The system controller has electronic means, such as a microprocessor, having preprogrammed operating routines or programming tasks that use this sensed information to determine the exact (actual) and desired (to be discussed) positions of the movable dispensing means $24_1 \ldots 24_n$ relative to the X axis of the system. The sensor $38_1$ may be of the conventional type, such as a shaft encoder, that detects the movement of the gathering belt $18_1$. For clarity and illustration purposes, there is only shown assigned order spaces 35, 37 and 39, but in actuality there may be many more spaces similar to 35, 37 and 39 on any one moving gathering belt $18_1$. Further, for clarity purpose, there is shown a plurality of chutes $26_1 \ldots 26_n$ positioned above a single gathering belt $18_1$, where in actuality the chutes $26_1 \ldots 26_n$ may be interrelated to a plurality of gathering belts $18_1 \ldots 18_n$. Moreover, for clarity purposes, there is shown a single sloped member $27_1$, where in actuality there are a plurality of such members located at a plurality of tiers, each of which member is positioned over one gathering belt $18_1 \ldots$ or $18_n$.

In operation, the products $14_1 \ldots 14_n$ are retrieved, in response to the system controller 32, from their respective storage locations by the stationary ($22_1 \ldots 22_n$) and movable ($24_1 \ldots 24_n$) dispensing means, and directed onto sloped members $27_1$ and/or chutes $26_1 \ldots 26_n$; whereupon the products are directed onto the assigned order space 35, 37 or 39. The assigned order spaces 35, 37 and 39 move along with the belt $18_1$, in the direction shown. Accordingly, a product, e.g., $14_1$, placed onto order space 35 from chute $26_1$ will be joined with another product, e.g., $14_3$, from chute $26_3$, when the order space 35, being carried by belt $18_1$, arrives at the location of the chute $26_3$. Similarly, the products of order space 35 may be joined by products $14_5, 14_6$ and $14_7$ when the order space 35 is positioned at the location where these products are directed by the sloped member $27_1$ onto the moving belt $18_1$. All different combinations of products may be retrieved from various storage locations for any assigned order space.

In general, the retrieval of products $14_1 \ldots 14_n$, is determined by the microprocessor of the system controller 32 which has preprogrammed operating routines that provide for, in part, controlling the at least one stationary dispensing means $22_1 \ldots 22_n$ located at a predetermined slot of a first portion of plate $28_1$, so that the vertically extending cog of each of the dispensers $22_1 \ldots 22_n$ is moved at a preselected time and for a predetermined rotational distance. The predetermined rotational distance that the cog is moved is established by the positioning of a photoswitch interconnected to the means for driving the cog. The microprocessor means of the system controller 32 is also responsive to preprogrammed operating routines that provide for controlling the at least one movable dispensing means $24_1 \ldots 24_n$ so that the dispensing means $24_1 \ldots 24_n$ is moved at a preselected time to a predetermined slot of the second portion of the plate $28_1$, after which, the vertically extending cog of the positioned dispensing means $24_1 \ldots 24_n$, is moved at a preselected time and for predetermined rotational distance. The preprogrammed operating routines commonly include the control of one or more stationary dispensers cooperating with one or more movable dispensers for retrieving the associated products. The overall operation of the system controller may be further described with reference to FIG. 4.

Figure 4B:
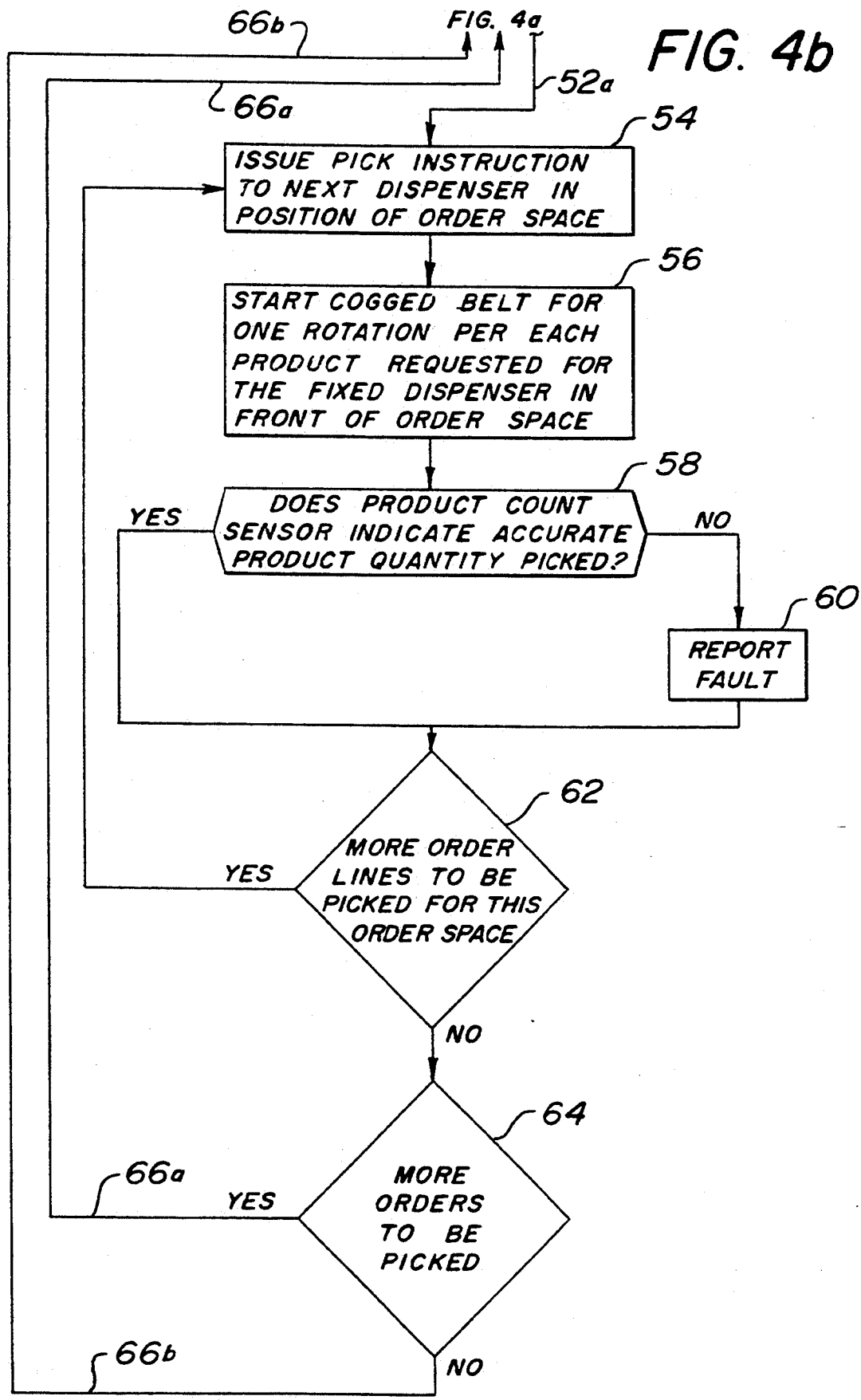
FIG. 4 is composed of parts 4a, 4b and 4c which, in total, illustrate a flow chart of the operation of the present invention.

FIG. 4 is a flow chart illustrating various events, processing tasks, and decisional choices, all related to the overall operation of the system controller 32. FIG. 4 is composed of parts 4a, 4b, and 4c, wherein FIG. 4a illustrates the routines of the system controller 32 that are common to the operation of both the stationary and movable dispensing means; FIG. 4b illustrates the routines associated with the stationary dispensers; and FIG. 4c illustrates the routines associated with the movable dispenser. The FIGS. 4a, 4b, and 4c are shown, where applicable, as being interconnected by the use of lettered subscript associated with particular element (box) of a particular FIG. 4a, 4b or 4c. For example, the function being performed by decisional element 52 of FIG. 4a, is shown as being associated with the processing 54 of FIG. 4b, by the use of reference number $52_a$ that designates a line running from FIG. 4a (element 52) to FIG. 4b (element 54).

The operation of the system controller begins with the event 40 (power up) shown in FIG. 4a. When the system 10 is first powered up, all of the movable dispensing means $24_1 \ldots 24_n$ automatically travel until they reach their respective home position, where the dispensers then await receipt of move and pick instructions from the system controller 32. The stationary dispensing $22_1 \ldots 22_n$ are always at their home position, and now (power up) await for instructions from the system controller 32. The system controller 32, in turn, waits (event 44) for selected order requests to be issued by the one or more customer's ordering system.

Upon receipt of a selected order request, the first step of the system controller 32 is to sum the quantity of the pieces requested for every line to be picked, for the selected order requests. Further, the system controller correlates the selected products to their assigned X, Y, Z storage locations (see event 46), and progresses to processing task 48.

The system controller, in task 48, retrieves from a sizing table the minimum space to allocate on the gathering belt to the selected order having the specified quantity of pieces. The sizing table may be a "look-up" type that has predetermined quantities, such as the physical size of the individual products. The system controller next calculates the size requirement for every line in the order (see Table 2 for definition). Preferably included in the calculations is the range of speeds at which the extended cog of either of the stationary and movable dispensing means types may engage the stored product embodiment without causing any scarring or marring of the package that encloses the product. The system controller then selects the line in the selected order request that has the greatest space requirement on the gathering belt. The system controller then compares that greatest space requirement with the minimum space requirement (see Table 2 for definition) for the order. The system controller then selects the larger of these two (greatest and minimum) sizes, and uses the larger size as the space to allocate on the gathering belt for this particular system order request.

Based on the required space on the gathering belt for each line to be picked, the system controller 32 (task 48) determines the proper position in the assigned order's allocated space in which to place the products being retrieved, so that the assigned order's allocated space has an even distribution of products on the gathering belt. Once the assigned order space is determined, the system controller assigns a "before order" and an "after order" safety gap (see Table 2 for definitions and FIG. 3 reference numbers 90 and 92 for physical positions) so as to account for any unplanned, sudden start or stop condition of the gathering belt. In addition to assigning the gathering belt length based on the selected order size, the system controller by means of information transmitted from various sensors such as $38_1$ of FIG. 3, tracks the operation for each line in the particular selection order request being serviced. The system controller after assigning the order gap to the assigned order space, then sequences to processing element 50 of FIG. 4a.

The system controller (element 50), then prepositions all of the moving dispenser means $24_1 \ldots 24_n$ to their respective first pick location, related to the selected order being processed which is termed "next order" in element 50. As shown in element 52 of FIG. 4a, the system 10 begins its picking or retrieval of products, from the back to front regions of the system 10. The system controller 32, in response to the selected order request, services such a request with either the stationary dispensing means, having an operation shown in FIG. 4b, or the movable dispensing means, having an operation shown in FIG. 4c, but most likely, with a combination of both the stationary and movable dispensing means. This combination may be comprised of stationary and movable dispensing means located at the same or different tiers.

FIG. 4b illustrates the sequential instructions, processing task and the decision making tasks, performed by the system controller during its operation of the stationary dispensing means $22_1 \ldots 22_n$. In general, and as functionally illustrated in FIG. 3, as the gathering belt $18_1$ having the assigned order space 39, approaches a storage location storing a product; e.g., product $14_n$, that is retrievable by a stationary dispensing means $22_n$, the system controller issues the necessary instructions so that the stationary dispensing means retrieves that product from its storage location, and moves that product so that it is directed onto a sloped member, e.g., $27_1$ or a chute e.g., $26_n$, allowing it to be directed onto the gathering belt $18_1$ within the assigned order space 39. If an additional product (see processing task 56 FIG. 4b) is required from the storage location serviced by the already activated stationary dispensing means, the now activated stationary dispensing means $22_n$ retrieves an additional product $14_n$, and also causes it to be also placed within the assigned order space 39. This additional product $14_1$ is placed within the assigned order space 39 as the belt $18_1$ continues its movement. The discussion of the direction of products $14_n$ by chute $26_n$ onto belt $18_n$ is only for illustrative purposes, because in actuality the assigned order space 39 may be serviced by multiple stationary dispensers cooperating with multiple movable dispensers, all of which are under the control of controller 32.

Fault detection means are incorporated in the operating programs of controller 32 of FIG. 4b as shown by processing events 58 and 60. More particularly, the preprogrammed routines of the microprocessor of the system controller 32, in response to sensors associated with each dispensing means, determines whether the product to be retrieved is available at the selected storage location, and whether or not the quantity of products placed onto the gathering belt agrees with the quantity of products requested to be retrieved by the stationary and/or movable dispensing means.

The operating routines of the microprocessor of the controller 32, as well as the fault sensing routines, associated with the operation of the movable dispensing means in response to the system controller, are illustrated in FIG. 4c, and may be described by first referring to FIG. 3.

In general, as the gathering belt $18_1$ having the assigned order space (35 or 37) approaches a storage location having a product included within the order selected request, the system controller initiates the instructions (see element 72 of FIG. 4c) so that the picking belt drive of the movable dispensing means $24_1 \ldots 24_n$, retrieves the designated product from its storage location, allowing the product to be directed by the related chute or sloped member onto the gathering belt $18_1$, and within the space allocated to the assigned order space. This control of the movable dispenser by the system controller is continued until all of the products serviced by that particular movable dispenser is appropriately placed onto the gathering belt. In a manner as described for the order space 39, the assigned order space 35 or 37 may also be serviced by one or more stationary dispensers, and furthermore, these order spaces may be serviced by stationary and movable dispensers located at the same or different tiers.

The system controller, controls both the movable and stationary dispensing means in such a manner that simultaneous selected order requests from one or more external computers are serviced by the system controller, and such simultaneous control may be described with reference to element 66 and 68 of FIG. 4c.

The elements 66 and 68 allow for the dynamic assignment of the assigned order space on the gathering belt 18a, even if the gathering belt and dispensing means $24_1 \ldots 24_n$ are moving, and accomplishes such by a lookahead feature embodied in element 66 and 68. In its operation, the system controller controls the one or more movable dispensing means by determining the present position of each of the dispensers and then looks ahead to see the next position where the dispensers under its control is to be respectively stopped. The present position may be considered, in a manner known in feed back controls, as the "actual" position, and the next position may be considered the "desired" position. There is an actual and a desired position for each of the one or more movable dispensers controlled by controller 32. The system controller, by monitoring external sensors detects the movement of each movable dispensing means along the X axis of its respective tier. The controller then determines the actual position of each of the movable dispensing means along the X axis which may be accomplished by preprogrammed routines in the microprocessor of the controller. The controller then compares the actual position of each movable dispensers against a respective desired position comprising the X axis address location (to be discussed), and terminates the movement of each movable dispensing means, when the actual position corresponds to the desired position. Upon such termination, the respective movable dispensing means is at the slot of the plate $28_1$ (to be further described) corresponding to one of the storage locations of the products within said selected order request being serviced by the system controller.

The microprocessor of the controller 32 handles the one or more movable dispensers in a similar manner as it handles the one or more stationary dispensers all selected to service an order space. That is, the microprocessor controls the stationary and movable dispensers so that the products retrieved by these dispensers are delivered onto the assigned order space as the space is being moved by the belt $18_1$. However, the preprogrammed routines allocate different times for the products to travel along the different paths of delivery; i.e., sloped members $27_1$ and chutes $26_1 \ldots 26_n$. More particularly, the routines take into account the additional amount of time needed for a product located on a upper tier 2, after it is retrieved from its storage location, to slide down and drop from a chute onto the belt $18_1$ as compared to a lesser amount of time needed for a product located on a lower tier 1 to be retrieved from its storage location and slide down the slope member $27_1$. The operation of the controller 32 may be further described with reference to FIG. 3.

With reference to FIG. 3 for a description of a typical retrieval of a product, assume a first moving dispenser is allocated to service f our separate storage locations respectively having four separate products $14_1$, $14_2$, $14_3$, and $14_4$, and which after being retrieved from their respective storage location on an upper tier, such as tier 2, are respectively intercepted and directed by chute $26_1$, $26_2$, $26_3$ and $26_4$ onto the gathering belt $18_1$. Further assume, a second moving dispenser is allocated to service three separate storage locations having three separate products $14_5$, $14_6$ and $14_7$, and which after being retrieved from their respective storage location on a lower tier, such as tier 1, are intercepted and directed by sloped member $27_1$ onto the gathering belt $18_1$. Further assume, that the gathering belt $18_1$ has been allocated, by the system controller, to have two separate assigned order spaces 35 and 37, and that the products $14_1$, $14_3$ and $14_5$ are to be respectively delivered within the assigned order space 35, and that the products $14_2$, $14_4$, $14_6$ and $14_7$ are to be respectively delivered onto the assigned order space 37. FIG. 3 shows the assigned order space 35 at a location along the belt $18_1$ after it has gone past chute $26_3$, whereas the assigned order space 37 is shown at a location in the general region of chute $26_2$. For the purpose of these assumed conditions, it is only important that the assigned order spaces 35 and 37 be separated from each other.

For such assumed conditions, the system controller 32 causes the first moving dispenser means, servicing the upper tier 2, to retrieve product $14_1$ which is placed onto the belt $18_1$ at the assigned order space 35. The controller next causes the second moving dispenser means, servicing the lower tier 1, to retrieve product $14_5$ which is directed onto the belt $18_1$, again at the assigned order space 35. The moving dispenser servicing the lower tier, as well as the moving dispenser servicing the upper tier, are operatively positioned before the assigned order space 35 arrives at their associated storage locations. The system controller intersperses the control of the moving dispensers of the upper and lower tiers (as well as, if needed, stationary dispensers of the upper and lower tiers), as it causes the products assigned to the order spaces 35 and 37 to be directed onto belt $18_1$.

The system controller intersperses its control by re-initiating the travel (see element 66 of FIG. 4) of the first dispenser that had last serviced order space 35, but now substitutes the next X-axis address (see element 68) as being related to the assigned order space 37, so that the first moving dispenser now retrieves product $14_2$, causing that product $14_2$ to be directed by chute $26_2$ onto the gathering belt in the assigned order space 37. Similarly, the system controller initiates the second dispenser's travel (see element 66 of FIG. 4) that had last serviced assigned order space 35, but now substitutes the next X-axis address (see element 68) as being related to the assigned order space 37 so that the second moving dispenser now retrieves product $14_6$ and which product is directed onto gathering belt $18_1$ by way of sloped member $27_1$.

The system controller now causes the first moving dispenser means (see element 66) to initiate its travel, but now reinserts the next X-axis address as that being related to the assigned order space 35, so that the moving dispenser now retrieves product $14_3$, and causes that product $14_3$ to be placed onto the assigned order space 35 that is being moved along by gathering belt $18_1$. The system controller now causes the second moving dispenser, which last serviced order space 37 to retrieve product $14_6$, to again service order space 37 by re-inserting X-address as being related to assigned order space 37, so that the product $14_7$ is directed onto the assigned order space 37 by way of the sloping member $27_1$. The system controller then causes the first moving dispenser to again initiate its travel, but now re-inserts the next X-axis address as being related to assigned order space 37, so that the product $14_4$ is now retrieved by the moving dispensing means and directed onto the gathering belt $18_1$ by way of chute $26_4$ at the specified assigned order space 37. The assigned order spaces 35 and 37 are shown in FIG. 3 as being free of products but, as described, respectively carry products, $14_1$-$14_5$-$14_3$ and $14_2$, $14_6$, $14_7$ and $14_4$. Further, in actuality these order spaces 35 and 37 carry products (not shown) that are retrieved by one or more stationary dispensing means located along one or more tiers.

Although a sequential retrieval of products has been assumed, the moving dispenser may have any type of sequence for the retrieval of products. The sequence of retrieval is defined by the order in which the assigned order spaces are serviced. For example, the moving dispenser may first retrieve a product $14_3$, which is placed onto space 35, and then go back (against the direction of movement of belt $18_1$) and retrieve a product $14_1$ which is placed onto space 37. The sequence, as well as the direction of movement of the movable dispensing means, is determined by the X-axis address assigned by the system controller 32. Further, the sequence at which the products are retrieved also includes the interaction between the stationary and movable dispensers. The system controller determines this interaction by controlling the movable and stationary dispensers in a manner as previously described. In a typical sequence, in addition to one or more movable dispensers, the stationary dispensers located at one or more tiers, one of which has been previously described as being related to chute $26_n$, cause the products associated with an order selection to be placed onto the assigned order space, such as 35 or 37. In all such sequences the system controller controls the one or more stationary dispensers and the one or more movable dispensers until all of the products of the assigned order spaces 35, 37 and 39 are retrieved.

It should now be appreciated that any of the moving dispensing means $24_1 \ldots 24_n$ or any of the stationary dispensing means $22_1 \ldots 22_n$ may service a plurality of storage locations by the appropriate control of the X-axis address as the moving dispensing means makes its way longitudinally along the moving gather belt $18_1$ and the stationary dispenser stays fixed relative to the belt. The moving dispensing means and the stationary dispensing means always being ready to retrieve the desired product from its storage location, before the assigned order space on the gathering belt arrives at that location.

The appropriate control of the X-axis address allows the system controller 32 to simultaneously service one or more selection order requests issued by one or more external ordering computer. For such simultaneous service, all that is needed is that the system controller appropriate select and correlate the X-axis addresses, in accordance with the selection order request then being responded to by the moving or stationary dispensing means, and then change that X-axis address to any related selected order request, as the moving dispenser is traveling, so that the dispensing means stops at the next storage location associated with that related selected order request. The system controller also causes one or more stationary dispensers to retrieve products associated with the related selected order requests. The system controller continues with the appropriate selection of the X-axis address control word as well as its control over the stationary dispensers, until all the selected order requests, that have occurred or will occur, have been serviced by the controller.

It should now be appreciated that the practice of the present invention provides for a system controller having a real time response to an external computer and provides dynamic assignment of the assigned order space on the gathering belt, so as to service simultaneous system order requests from one or more external devices.

The operation of the dispensing means $22_1 \ldots 24_n$ illustrated in FIG. 4, may be further described with reference to FIGS. 5, 6 and 7, in which FIG. 5 is a view, taken along line 5—5 of FIG. 1, showing further details of the movable dispensing means $24_1$ of FIG. 1. FIG. 5 illustrates the movable dispensing means $24_1$ as being situated under the guiding plate $28_1$, previously mentioned with reference to FIG. 1. The movable dispensing means of FIG. 5, includes elements shown in Table 3.

TABLE 3

| Movable Dispensing Means 24 | |
|---|---|
| Reference Symbol | Element |
| 24A | drive wheel (idler) |
| 24B | drive wheel (motor) |
| 24C | vertical extended cog members (shown as being two) |
| 24D | optical sensor |
| 24E | optical sensor |
| 24F | optical sensor |
| 24G | drive motor |
| 24H | timing chain |
| 24I | carriage horizontal support member |
| 24J | carriage member coupled to one of the X rail $30_1$ |
| 24K | carriage member coupled to the other X axis rail $30_1$ |
| 24L | vertical member for supporting dispensing means in $24_1$ its elevated - sloped position as shown in FIG. 5 |
| 24M | carriage member for coupling to traveling belt 104 |

The stationary dispensing means $22_1 \ldots 22_n$, shown in the rear section of FIG. 1, are comprised of the same elements as that of Table 3, except these stationary dispensing means do not have the carriage members 24I, 24J, 24K, 24L, 24M, but rather have a member (not shown) that causes the stationary dispensing means $22_1 \ldots 22_n$ to be arranged at a position which is elevated and sloped relative its support plate (not shown), in the same manner as dispensing means $24_1$ is shown in FIG. 5 as being positioned relative to support plate $28_1$. Each of dispensing means $22_n \ldots 24_n$, has at least one, and preferably two, cogs 24C, with a first cog positioned forward of the product $14_1$ in its at-rest position, and the other cog positioned rearward of the same product in its at-rest position. In a manner as shown in FIG. 5, each of the stationary ($22_1 \ldots 22_n$) and movable ($24_1 \ldots 24_n$) dispensing means has its first (24A) and second (24B) drive wheels separated from each other by a distance which exceeds the maximum width-wide dimension (shown in FIG. 5 as being above chain 24H) of the products $14_1 \ldots 14_n$ stacked in the storage locations $16_1 \ldots 16_n$. All of the stationary and movable dispensing means $22_1 \ldots 24_n$, have electrical means 24N (shown in FIG. 6 to be discussed) for receiving the electrical information from the system controller 32, as well for sending the sensing information of sensors 24D, 24E, and 24F, preferably of the optical type, to the system controller 32.

The sensor 24D detects and allows the system controller to count when each product, such as $14_1$ of FIG. 5, is retrieved from its storage location. Sensor 24E allows the system controller to detect the movement of chain 24 by sensor 24E detecting the passage of cog 24C thereunder. Sensor 24F detects when the associated storage location no longer has any products therein.

These detectors supply the system controller 32 with feedback information so that the system controller can properly track the flow of the retrieval of the desired product from its storage location onto the gathering belt and also the proper operation of each dispenser means $22_1 \ldots 24_n$, as it retrieves the desired product from its associated storage location. For example, optical sensor 24F of FIG. 5 positioned under the product $14_1$ and transmitting an upwardly directed light beam, when not sensing a returned beam (no products in storage locations to reflect the beam downwards) becomes active and, thereby, notifies the controller that there are no available products within that particular storage location, so that the controller may alter its operating routines to retrieve that desired product from a different storage location, and also to notify an external monitoring device, such as an observing operator, that the particular storage location housing the first-sought-after product requires replenishment. The system controller 32 looks to sensor 24D to supply information that the requested product being removed from the storage location, has in fact been so removed. This determination occurs because the sensor 24D detects the passage of the leading edge of the product, such as $14_1$, down the contoured portion 28B, of the guide plate $28_1$ as the product $14_1$ is being removed or retrieved from its assigned storage location. The sensor 24E supplies the system controller with the information to ensure that when the system controller commanded the cog 24C to be moved so as to retrieve a product, in fact the cog 24C did move because such movement was detected by at least one or the other cog 24C passing under the detector 24E.

The movable dispenser $24_1$ is supplied with a signal and power excitation, via cable 102, and is moved by track belt 104. The signal information within cable 102 includes the sensors' (24D, 24E and 24F) data, and the related data of the system controller discussed with reference to FIG. 4, whereas the power excitation in cable 102 is routed to the drive motors of the dispensing means $22_1 \ldots 24_n$, and to the circuitry of the dispensing means $22_1 \ldots 22_n$ that provides communication to and from the system controller 32. The track belt 104 is attached to the movable dispensing means $24_1$, by coupling device 24M so as to allow the dispensing means to be longitudinally moved along and guided by the X-axis tracks $30_1$. The cable 102 and track belt may be further described with reference to FIG. 6 which is a view, taken along line 6—6, of FIG. 5.

The cable 102 is positioned within a hollow of a flexible strap 106. The flexible strap 106 follows behind the dispenser $24_1$ as it is longitudinally moved along the X axis rails $30_1$ by the traveling belt 104. The cable 102 is routed to electrical means 24N that assists in the exchange of information between the dispensing means $22_1 \ldots 24_n$ and the controller 32. The strap 106, by being flexible and segmented into portions, lays itself down in a sequential manner, so that the cable 102 does not become tangled as it follows behind the moving dispensing means $24_1$.

The traveling belt 104 has incremental members 104A that are spaced apart from each other by a predetermined amount. The spacing between members 104A determines, in part, the accuracy at which the movable dispensing means $24_1$ is longitudinally positioned along the X axis rail, so that its cog member 24C may be positioned within a predetermined slot 28C of the guide plate $28_1$. The traveling belt 104 is continuous and has an upper portion 104C and a lower portion 104D, respectively shown in the lower-right corner of FIG. 6 as being above and below the X-axis rail $30_1$. The traveling belt 104 is coupled to drive means (not shown) of the tier in which it is located, with the drive means being of a conventional type, such as an electrically responsive motor drive, and being responsive to the system controller 32, so that dispensing means $24_1$ may be positioned anywhere along the X axis rails in response to the electrical commands from controller 32.

Figure 6:
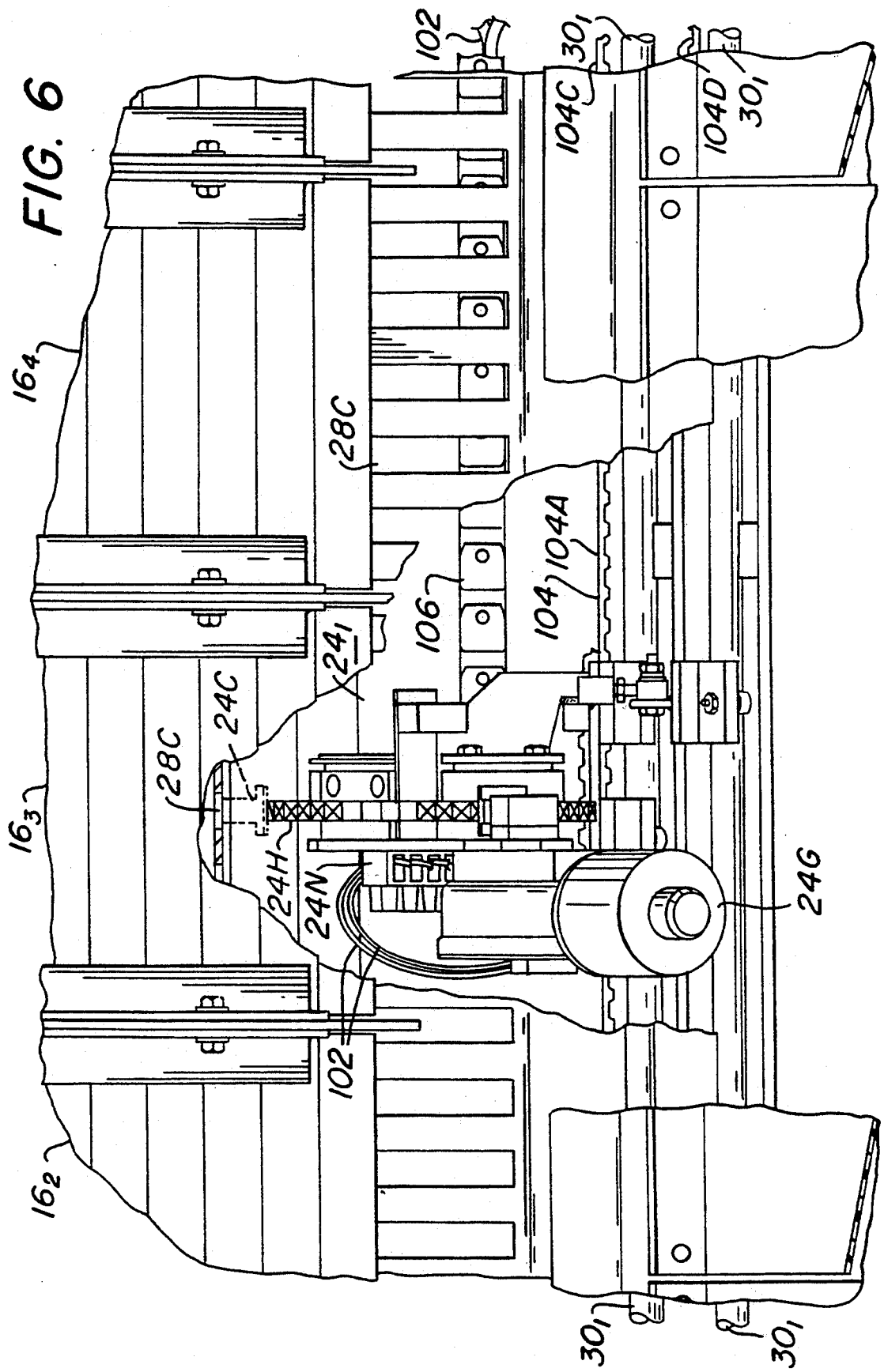
FIG. 6 is a view, taken along line 6—6 of FIG. 5, further illustrating details of the movable dispensing means.

As shown in the central portion of FIG. 6, the cog 24C of dispensing means $24_1$, has a width which is less than the width of the slot 28C. The cog 24C is carried, in its at-rest lowered position, to that selected slot 28C by the dispensing means $24_1$ which is attached to the traveling belt. The traveling belt, in response to the drive means, delivers the dispensing means $24_1$ to the selected slot 28C. The drive means causes movement of the traveling belt until the dispensing means is at the preselected slot determined by the operating routines of the system controller 32. The position of the cog 24C within the slot 28C, so as to retrieve a particular product $14_1 \ldots 14_n$ in a particular storage location $16_1 \ldots 16_n$, is achieved by the dispensing means $24_1$ being positioned on the X axis rail so that its cog member 24c may be positioned within a predetermined slot 28c of the guide plate $28_1$. The operation of the cog 24C retrieving a particular product in a particular storage location, may be further described with reference to FIG. 5.

Initially, when the movable dispensing means $24_1$ arrives at its designed slot 28C, both cogs 24C are in their at-rest position, as shown in solid lines in FIG. 5. In response to the system controller, the cog 24C which is forward of the product $14_1$, is moved into its respective slot 28C (not shown in FIG. 5 but clearly shown in FIG. 7 to be described) so as to come into contact and begin the movement of the product $14_1$. The horizontal force exerted by cog 24C of FIG. 5 causes the product $14_1$ to be moved out from its storage location. The midpoint of such movement is shown in FIG. 5 in phantom for both the product $14_1$ and the contacting cog 24C. The cog 24C continues its rotational movement and the product $14_1$ is fully moved out from within the confines of its storage location. As the product exits its storage location it begins a downward motion on the sloped contoured portion 28C of the guide plate $28_1$, and such movement may be further described with reference to FIG. 7.

FIG. 7 shows the cog 24C within one of its assigned slots 28C and as first contacting the product $14_1$. Continued movement of cog 24C along and within slot 28C causes the product $14_1$ to be moved along and then down the contoured slope portion 28B, and into a respective chute $26_1$ which directs the product $14_1$ onto the gathering belt 18 in manner as previously described with reference to FIG. 3. FIG. 7 shows the cog 24C at one edge of the product $14_1$; however, in actuality, the cog 24C is preferably positioned in a slot 28C which has the central portion of the product $14_1$ resting thereon. Further, FIG. 7 shows the preferred arrangement of the plate $28_1$ as being mated with a sloped member 108 of the related tier, although, if desired, the plate $28_1$ may be directly mated with the chute $26_1$.

The chute 26 is of particular importance to the present invention and preferably comprises a thin sheet 26A of plastic material, e.g., 1/16" thick polyethylene material. The chute $26_1$ preferably has an open-funnel shape, with one of its ends raised above its other end. The thin sheet 26A has vertical flanges 26B that allow it to be fastened to the sloped structure member 108 that cooperates with the guide plate $28_1$. The sheet 26A is shaped to have two vertical sides 26C and curved bottom portions 26D. The center line 26E, of the bottom portions 26D, is arranged to have a sloped angle $\alpha$ relative to a horizontal plane 110 that is coaxial with the X axis of the system 10. The angle $\alpha$ is selected to be of a value to ensure that the items $(14_1 \ldots 14_n)$ that are directed into the chute $26_1$ slides down the chute $26_1$, and exit at the lower end of the bottom portion 26D.

The function of the flexible chute is to ensure that the items falling into the chute $26_1$ close to the vertical side, slide through the curved radius portion of chute $26_1$, and exit from the central region of portion 24, so as to soften the impact of the products, such as $14_1$, that are gliding down the plate $28_1$ and onto the gathering belt $18_1$. Items that fall directly onto the center line of chute $26_1$ are cushioned on impact by the flexing of the thin material of the chute $26_1$. The softening action of the chute $26_1$ tends to eliminate any bouncing or movement of the products $14_1 \ldots 14_n$ as they arrive onto the gathering belt $18_1$. Such elimination allows the products to be more readily confined within their assigned order space on the gathering belt $18_1$, so as to more efficiently use the gathering belt $18_1$ itself.

It should now be appreciated that the present invention provides for a system that controls any number of dispensing means $22_1 \ldots 24_n$, in a manner to efficiently retrieve and direct packaged items or products from their storage locations to a central collection station for future shipment to a requested customer. The system controller 32 integrates the operation of all of the dispensing means $22_1 \ldots 24_n$, in such a manner that all of the products, related to all of the selected order requests, are retrieved from the predetermined storage locations, and arrive at the central gathering station.

The system controller 32 microprocessor means is preprogrammed with operating routines which are easily adapted to accommodate for increases or decreases in any warehouse configurations. The adaptability of the system controller 32, along with the other elements of the order selection system 10, allows the present invention to meet the ever increasing demands of warehouse storage and retrieval of consumer and other type products. Further, the system controller operates on a real time basis and dynamically assigns the allocated space on the gathering belt, so as to allow for servicing of substantially simultaneous requests from one or more various order selection computers.

Still further, the present invention also provides for a flexible chute that allows for the retrieved products to be directed onto the gathering belt in such a manner so as to better utilize the available space on the gathering belt itself.

The present invention may be embodied in other specific forms without departing from the spirit or essential attributes thereof and, accordingly, reference should be made to the appended claims, rather than to the foregoing specification as indicating the scope of the invention.

What we claim is:

1. An order selection system for retrieving products stored in predetermined storage locations and delivering such retrieved products to a central gathering station by one or more conveyors comprising a dynamically moving gathering belt, said stored products being classified in accordance with their public demand as being slow, medium or fast moving, said storage locations comprising one or more tiers arranged on vertically oriented frame members and having X, Y and Z axes, some of said tiers having drive means responsive to a system controller for moving a mechanism longitudinally along the X-axis of the tier, said predetermined storage locations each having predetermined coordinates of said X, Y and Z axes, said system comprising:

(a) a plurality of plates for supporting said products thereon, each plate having at least a downwardly contoured portion located above said gathering belt, said plates further having a plurality of slots each extending through and into at least a part of said contoured portion, said slots being arranged to be in communication with said products, said plates extending longitudinally along the X axis of said storage modules and segmented into first and second portions;

(b) at least one stationary dispensing means having at least one vertically extending cog and located at a predetermined slot along said first portion of said plates, said stationary dispensing means being responsive to said system controller;

(c) at least one movable dispensing means having at least one vertically extending cog, and having means responsive to said drive means and means responsive to said system controller, said movable dispensing means being longitudinally movable along said second portion of said plates to a preselected slot thereof; and (d) a system controller having means responsive to and servicing a selected order request issued by an external device, said selected order request including a specified quantity of each product that makes up said selected order request, said system controller dynamically assigning a space on said gathering belt to said selected order request, said system controller comprising:

(i) means for controlling said at least one stationary dispensing means located at said predetermined slot of said first portion of said plate so that its said cog is moved at a preselected time and for a predetermined distance;

(ii) means for controlling said at least one movable dispensing means so that said movable dispensing means is moved at a preselected time to a preselected slot of said second portion of said plate, after which, its said cog is moved at a preselected time and for a predetermined distance;

(iii) means for identifying a storage location corresponding to each product included within said selected order request;

(iv) means for determining a total space on said moving gathering belt needed to accommodate all of the products included within said selected order request, said total space comprising a dynamically assigned order space on said moving gathering belt for said selected order request; and (v) means for correlating said means for controlling said stationary dispensing means with said means for controlling said movable dispensing means, so that each of said products is retrieved from its storage location and placed on said gathering belt within said dynamically assigned order space while said gathering belt is moving.

2. An order selection system according to claim 1, wherein said at least one stationary dispensing means is located at a predetermined slot that is arranged in communication with a fast moving product.

3. An order selection system according to claim 1, wherein said means for correlating said means for controlling said stationary dispensing means with said means for controlling said movable dispensing means comprises means for assigning an x axis address location to the desired storage location to which said movable dispensing means is being moved, and then dynamically changing that desired X axis location to correspond to the selected order request being serviced by said system controller.

4. An order selection system according to claim 3, wherein said means for controlling said movable dispensing means further comprises:

(a) detector means for detecting the movement of said movable dispensing means along said X axis of said tier;

(b) means responsive to said detector means for determining the actual position of said movable dispensing means along said axis; and (c) means for comparing said actual position against a desired position comprising said X-axis address location and for terminating movement of said movable dispensing means when said actual position corresponds to said desired position; whereby said movable dispensing means is moved to the slot corresponding to the product within said selected order request being serviced by said system controller.

5. An order selection system according to claim 1 wherein each of said means for controlling said at least one stationary dispensing means and said means for controlling said at least one movable dispensing means further comprises:

(a) means for sensing the retrieval of said product as it is being retrieved from its storage location; and (b) means for sensing the movement of said cog as it is being moved for its said predetermined distance.

6. An order selection system according to claim 1, wherein each of said means for controlling said at least one stationary dispensing means and said means for controlling said at least one movable dispensing means further comprises means for determining the range of speeds at which said cog may contact said product without causing any scarring thereof.

7. An order selection system according to claim 1, wherein said means for identifying storage location further comprises means for sensing the presence of said products within said storage locations.

8. An order selection system according to claim 1, wherein said cogs of both said stationary and movable dispensing means have an at-rest position located below said slots of said plate and said movable dispensing means being movable only when its cog is in its at-rest position.

9. An order selection system according to claim 1, wherein said means for determining the total space on said gathering belt of said selected order request includes means identifying the physical size of each of said products within said selected order request.

10. An order selection system according to claim 1, further comprising a chute comprising a flexible material and arranged to intercept a product retrieved from said storage location and direct said product onto said gathering belt.

11. An order selection system according to claim 10, wherein said chute is comprised of a flexible plastic material and has an open-funnel shape with one of its ends being raised above its other end.

12. A method of operating an order selection system having a system controller for controlling the retrieval of products from storage locations of storage modules in a warehouse, and delivering such retrieved products to a central gathering station by at least one conveyor comprising a dynamically moving gathering belt, said stored products being classified in accordance with public demand as being slow, medium or fast moving, said storage locations comprising one or more tiers arranged on vertically oriented frame members and having X, Y and Z axes, some of said tiers having drive means for moving a mechanism longitudinally along the X-axis of the tier, said method comprising the steps of:

(a) providing a guiding plate for supporting said products thereon and having at least a downwardly contoured portion and a plurality of slots each extending through and into at least a part of said contoured portion, said plate having a first and a second portion, said plate being located below said storage locations and said downwardly contoured portion being located above said gathering belt;

(b) arranging said products in predetermined storage locations, in a stacked manner, to be in communication with said slots of said plate;

(c) providing at least one stationary dispensing means having at least one vertically extending cog positioned along said first portion of said plate at a predetermined slot thereof, said stationary dispensing means further being provided with means responsive to a system controller;

(d) providing at least one movable dispensing means having at least one vertically extending cog, and having means responsive to said drive means of said tiers and means responsive to said system controller for moving said dispensing means longitudinally along said second portion of said plate to predetermined slots thereof;

(e) providing a system controller having means responsive to and servicing a selected order request issued by an external device, said selected order request including a specified quantity of each product that makes up the order, said system controller dynamically assigning a space on said moving gathering belt to said selected order request;

(f) controlling said at least one stationary dispensing means located at said predetermined slot so that its cog is moved at a preselected time and for a predetermined distance;

(g) controlling said at least one movable dispensing means so that said movable dispensing means is moved at a preselected time to a preselected slot of said second portion of said plate, after which, its said cog is moved at a preselected time and for a predetermined distance;

(h) identifying a storage location corresponding to each product included within said selected order request;

(i) determining a total space on said gathering belt needed to accommodate all of the products included within said selected order request, said total space comprising a dynamically assigned order space on said moving gathering belt for said selected order request; and (j) correlating said means for controlling said stationary dispensing means with said means for controlling said movable dispensing means, so that each of said products that is retrieved from its storage location is placed on said gathering belt within said dynamically assigned order space while said gathering belt is moving.

13. A method of operating an order selection system according to claim 12, wherein said providing said at least one stationary dispensing means is located at a predetermined slot that is arranged in communications with a fast moving product.

14. A method of operating an order selection system according to claim 12, wherein said correlating means for controlling said stationary dispensing means with said means for controlling said movable dispensing means comprises:

(a) assigning an X axis location to the desired storage location to which said movable dispensing means is being moved; and (b) dynamically changing the desired X axis location to correspond to selected order request being serviced by said controller.

15. A method of operating an order selection system according to claim 14, wherein said step for controlling said movable dispensing means further comprises:

(a) detecting the movement of said movable dispensing means along said X axis of said tier;

(b) determining the actual position of said movable dispensing means along said axis; and (c) comparing said actual position against a desired position comprising said X-axis address location and terminating said movement of said movable dispensing means when said actual position corresponds to said desired position; whereby said movable dispensing means is moved to the slot corresponding to the product within said selected order request being serviced by said system controller.

16. A method of operating an order selection system according to claim 12, wherein said step for controlling said at least one stationary dispensing means and said step for controlling said at least one movable dispensing means further comprises the steps:

(a) sensing the retrieval of said product as it is being retrieved from its storage location; and (b) sensing the movement of said cog as it is being moved for its said preselected distance.

17. A method of operating an order selection system according to claim 12, wherein said step for controlling said at least one stationary dispensing steps and said step for controlling said at least one movable dispensing means further comprises means for determining the range of speeds at which said cog may contact said product without causing any scarring thereof.

18. A method of operating an order selection system according to claim 12, wherein said step of identifying the storage location further comprises the step of sensing the presence of said product within said storage location.

19. A method of operating an order selection system according to claim 12, wherein the steps of controlling said stationary and movable dispensing means each further comprises the step of ensuring that said cog of said movable dispensing means include an at-rest position that is at a position below said slots of said plate, and that said movable dispensing means is moved only when its respective cog is in its at-rest position.

20. A method of operating an order selection system according to claim 12, wherein said step of determining the total space on said gathering belt of said selected order request includes a step of identifying the physical size of each of said products within said selected order request.

21. A method of operating an order selection system according to claim 12, further comprising the step of providing a chute comprising a flexible material and arranging such to intercept a product retrieved from said storage location and direct said product onto said gathering belt.

22. A method of operating an order selection system according to claim 21, wherein the step of providing said chute includes providing a chute comprising a flexible plastic material and having an open-funnel shape with one of its ends raised above its other end.

* * * * *